(12) United States Patent
Nakamura

(10) Patent No.: US 9,694,691 B2
(45) Date of Patent: Jul. 4, 2017

(54) ELECTRIC VEHICLE

(71) Applicant: SUZUKI MOTOR CORPORATION, Hamamatsu-Shi, Shizuoka-Ken (JP)

(72) Inventor: Yuta Nakamura, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/335,594

(22) Filed: Oct. 27, 2016

(65) Prior Publication Data

US 2017/0113556 A1    Apr. 27, 2017

(30) Foreign Application Priority Data

Oct. 27, 2015 (JP) .................................. 2015-210395

(51) Int. Cl.

| | |
|---|---|
| *B60K 11/08* | (2006.01) |
| *B62J 17/00* | (2006.01) |
| *B60K 6/32* | (2007.10) |
| *B60L 11/04* | (2006.01) |
| *B62K 11/04* | (2006.01) |
| *B60L 11/18* | (2006.01) |

(52) U.S. Cl.
CPC ............. *B60L 11/04* (2013.01); *B60K 11/08* (2013.01); *B60L 11/1877* (2013.01); *B60L 11/1883* (2013.01); *B62K 11/04* (2013.01); *B60L 2210/10* (2013.01); *B60Y 2200/12* (2013.01); *B60Y 2400/112* (2013.01); *Y10S 903/904* (2013.01)

(58) Field of Classification Search
CPC .......... B60L 11/04; B60L 11/06; B60L 11/08; B60L 11/10; B60L 11/123; B60L 2210/10; B60K 11/08; B60K 11/04; B60Y 2200/12

USPC .................................. 180/220, 229, 68.3
See application file for complete search history.

(56) References Cited

U.S. PATENT DOCUMENTS

| | | | | |
|---|---|---|---|---|
| 4,964,484 A | * | 10/1990 | Buell ........................ | B62J 17/00 180/219 |
| 7,370,902 B2 | * | 5/2008 | Seki ......................... | B62J 17/02 180/68.1 |
| 8,936,123 B2 | * | 1/2015 | Kogo ................... | B60Q 1/0433 180/219 |

(Continued)

FOREIGN PATENT DOCUMENTS

JP    2002187587 A    7/2002

*Primary Examiner* — Tony Winner
(74) *Attorney, Agent, or Firm* — Barnes & Thornburg LLP

(57) ABSTRACT

An electric vehicle enables cooling performance for a DC/DC converter to be improved and includes a steering mechanism supporting a front wheel, a head pipe supporting the steering mechanism, a frame member extending from the head pipe backward and downward, a front cowl covering the head pipe, the front cowl hanging and extending to a lower-half of the front wheel, an electric motor rotating and drive the rear wheel, a DC/DC converter disposed in the frame member behind the front wheel in a posture facing a travelling direction to convert voltage, and a heat radiation fin extending in a vehicle vertical direction, the heat radiation fin being provided in a front face of the DC/DC converter, the front face facing the front wheel. The front cowl expands to left and right sides of the DC/DC converter in the vehicle width direction to collect travelling wind to the heat radiation fin.

8 Claims, 10 Drawing Sheets

(56) References Cited

U.S. PATENT DOCUMENTS

| | | | | |
|---|---|---|---|---|
| 2011/0181345 A1* | 7/2011 | Ramanathan | ........... | G11C 11/16 327/509 |
| 2011/0240392 A1* | 10/2011 | Iwata | .................... | B60K 11/04 180/229 |
| 2015/0328979 A1* | 11/2015 | Matsuo | ................. | B60K 11/04 180/229 |

\* cited by examiner

ELECTRIC VEHICLE

CROSS-REFERENCE TO RELATED APPLICATIONS

This application claims the benefit of priority of Japanese Patent Application No. 2015-210395, filed on Oct. 27, 2015, the entire contents of which are incorporated herein by reference.

BACKGROUND OF THE INVENTION

Field of the Invention

The present invention relates to an electric vehicle.

Description of the Related Art

A DC/DC converter that converts a high voltage to 12 voltage is provided to an electric vehicle travels by driving an electric motor using electric power of a fuel cell or a battery, for example, a rechargeable battery, and a hybrid type vehicle travels using driving force of an engine and driving force of an electric motor.

The DC/DC converter generates heat during voltage conversion, and its conversion efficiency deteriorates at high temperature. Thus, the DC/DC converter is generally water-cooled if output voltage exceeds 1 kW, and is air-cooled if the output voltage is 1 kW or less. In a case where an electric vehicle has an air-cooled DC/DC converter, the DC/DC converter is disposed in a side face (refer to Japanese Patent Laid-Open No. 2002-187587) or in a bottom face of the vehicle, along which travelling wind flows.

SUMMARY OF THE INVENTION

Unfortunately, disposing the DC/DC converter only in a side face or a bottom face of a vehicle may cause insufficient cooling of the DC/DC converter. There are countermeasures such as increasing size of heat radiation fins of the DC/DC converter, or using a blast fan to force cooling, however, a small-sized vehicle such as a motorcycle is structurally difficult to take such countermeasures.

In addition, if the DC/DC converter is away from a battery storing electric power converted by the DC/DC converter, a power supply wire with a large diameter connecting the DC/DC converter and the battery is increased in length.

To solve the problems described above, it is an object of the present invention to provide an electric vehicle capable of improving cooling performance for a DC/DC converter.

To achieve the above object, an aspect of the present invention provides an electric vehicle including a front wheel, a rear wheel, a steering mechanism supporting the front wheel, a head pipe supporting the steering mechanism, a frame member extending from the head pipe backward and downward, a front cowl covering the head pipe, the front cowl hanging and extending to a lower-half of the front wheel, an electric motor configured to rotate and drive the rear wheel, at least one DC/DC converter disposed in the frame member behind the front wheel in a posture facing a travelling direction to convert voltage, and a heat radiation fin extending in a vehicle vertical direction, the heat radiation fin being provided in a front face of the DC/DC converter, the front face facing the front wheel. The front cowl expands to left and right sides of the DC/DC converter in the vehicle width direction to collect travelling wind to the heat radiation fin.

In preferred embodiments of the above aspect, the following modes may be provided.

It may be desired that the at least one converter comprises a plurality of converters, and the converters are disposed away from each other in the vehicle vertical direction.

It may be further desired that a battery disposed above the DC/DC converter and on a side of the head pipe to be connected to the DC/DC converter.

It may be desired that the electric vehicle is a motor scooter, and the battery is disposed in a glove box disposed behind the front cowl.

It may be further desired that a fuel cell connected to the DC/DC converter.

This electric vehicle enables cooling performance for the DC/DC converter to be improved.

DETAILED DESCRIPTION OF THE PREFERRED EMBODIMENTS

Hereinafter, an embodiment of an electric vehicle according to the present invention will be described with reference to FIGS. 1 to 10.

Figure 1:
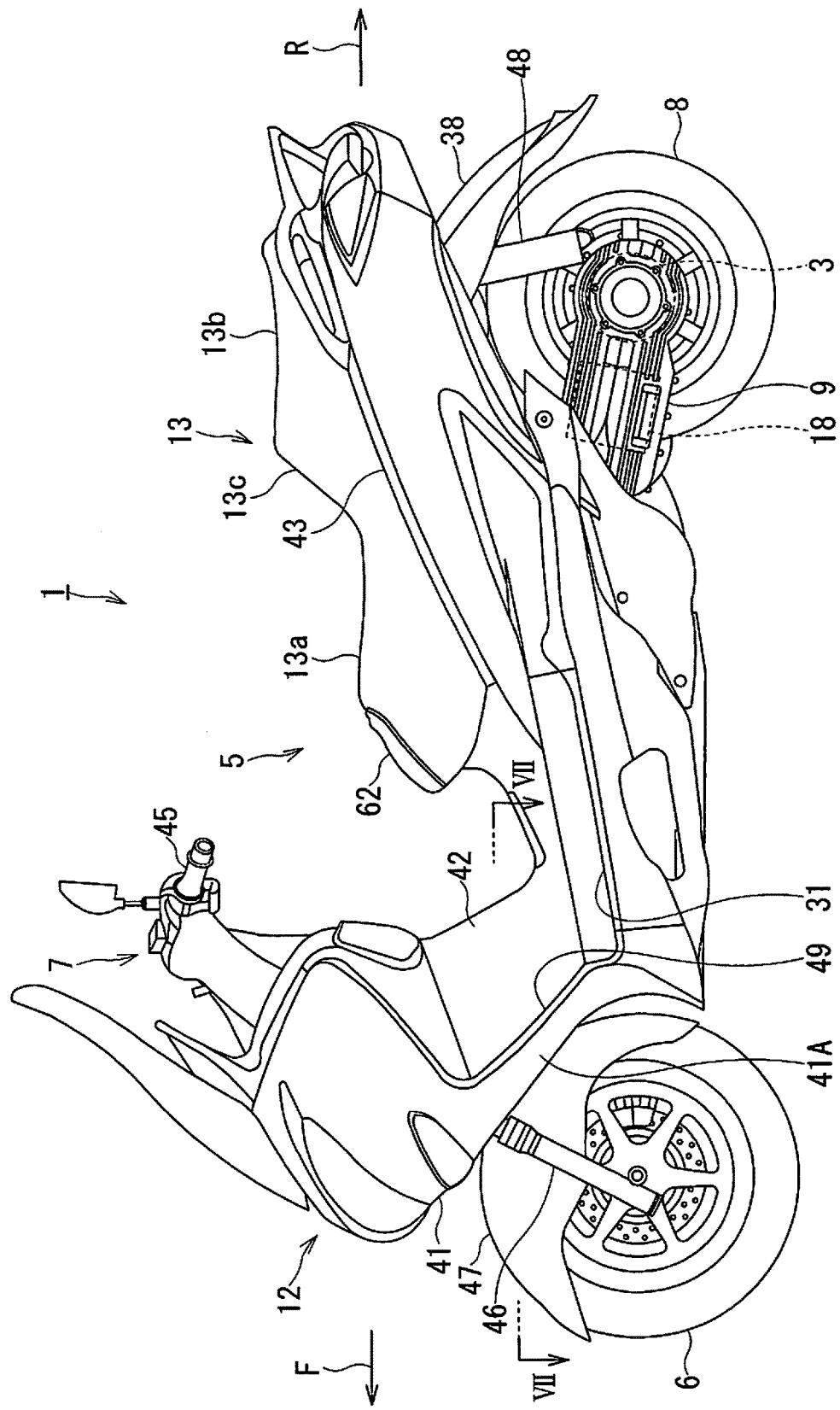
FIG. 1 is a left side view illustrating an electric vehicle according to an embodiment of the present invention.

FIG. 1 is a left side view of the electric vehicle according to an embodiment of the present invention.

Figure 2:
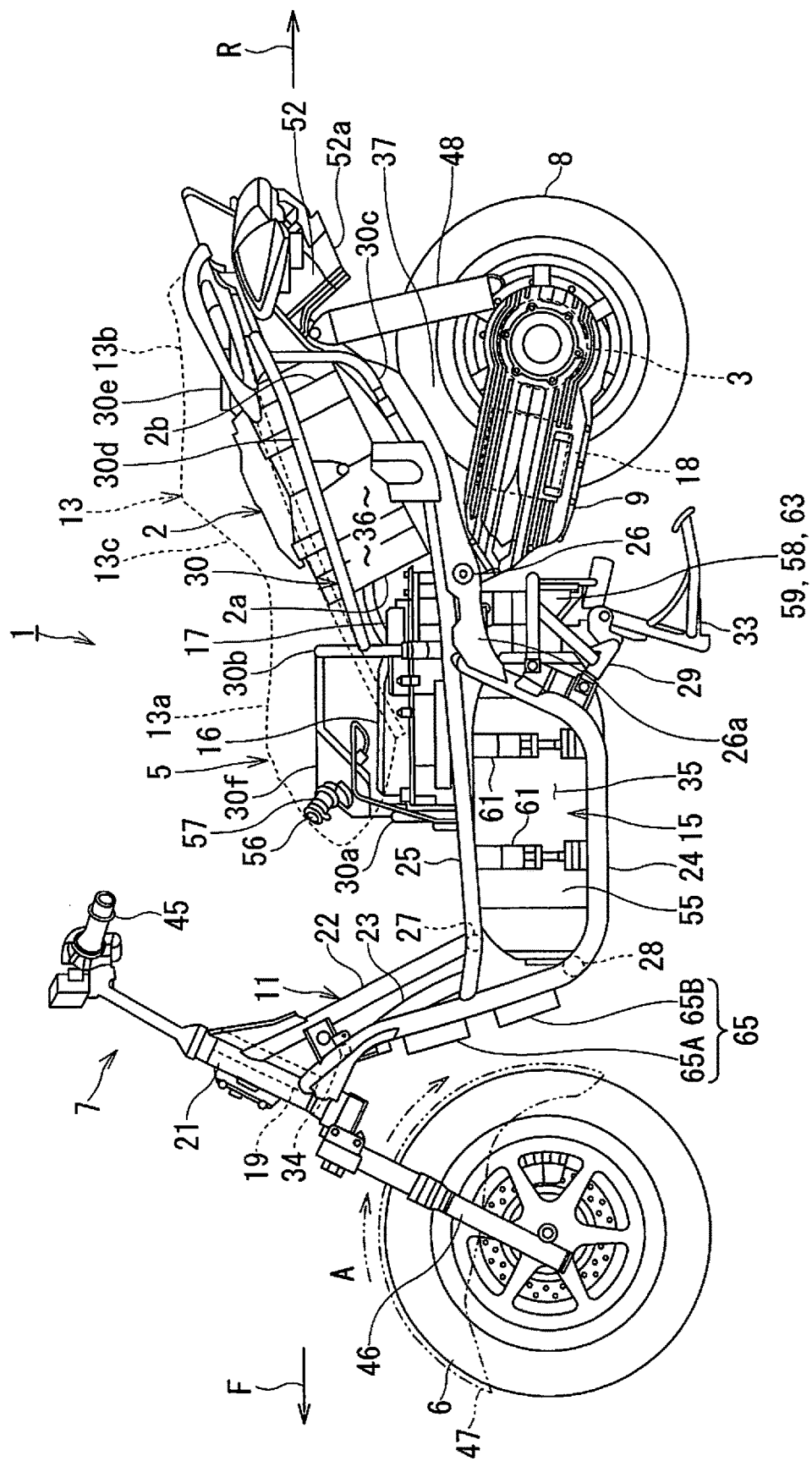
FIG. 2 is a left side view of the electric vehicle according to the present invention, with its exteriors being detached.

FIG. 2 is a left side view of the electric vehicle according to an embodiment of the present invention, with its exteriors, for example, covers and a seat being detached.

Figure 3:
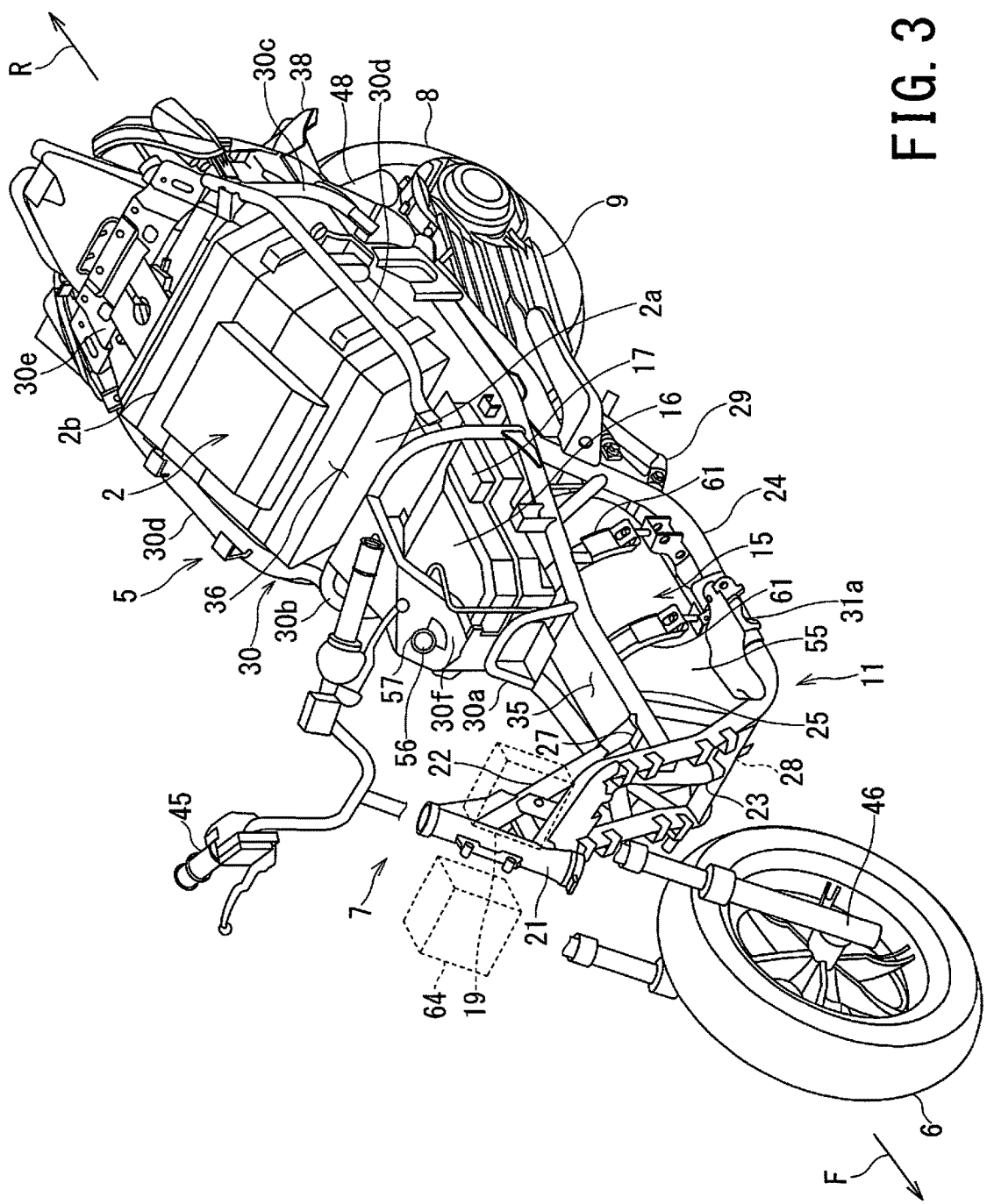
FIG. 3 is a perspective view of the electric vehicle according to the present invention, with its exteriors being detached.

FIG. 3 is a perspective view of the electric vehicle according to an embodiment of the present invention, with its exteriors, for example, covers and a seat being detached.

Note that expressions of front-and-rear, up-and-down, and left-and-right in the present embodiment are based on reference to a rider onboard an electric vehicle 1. In FIGS. 1 to 3, a solid line arrow F represents forward of the electric vehicle 1, and a solid line arrow R represents reward of the electric vehicle 1.

As shown in FIGS. 1 to 3, the electric vehicle 1 according to the present embodiment travels by being driven by an electric motor 3 powered by a fuel cell 2. The electric vehicle 1 is a motorcycle of motor-scooter type, and also a fuel cell powered bicycle traveling by the power of the fuel cell 2. The electric vehicle 1 may also be a tricycle. It may be a type of vehicle that travels by being driven by the electric motor 3 that is powered by a rechargeable battery (not shown) in place of the fuel cell 2.

The electric vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the electric vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The electric vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the electric vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right lower frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the electric vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the electric vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. A spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the electric vehicle 1. Each of the left and right lower frames 24 includes a foot rest bracket 31a. The foot rest bracket 31a supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the electric vehicle 1 stand by itself in a leftwardly inclined manner. The side stand swings between an erected position for making the electric vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26a. Each of the brackets 26a is located below the upper frame 25 and in the rear of a merging portion (upper and down frame joining part) between the upper frame 25 and the lower frame 24. Each of the brackets 26a is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the electric vehicle 1 stand by itself in an upright state. The center stand 33 swings between an erected position for making the electric vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the electric vehicle 1 of a near-head-pipe bridge frame 34 constructed between the left and right lower frames 24, and a lower end part connected to a central part in the left and right direction of the electric vehicle 1 of the lower bridge frame 28.

The mounted-instrument protection frame 30 is provided above the rear half part of the upper frame 25. The mounted-instrument protection frame 30 supports and secures the fuel cell 2 to the electric vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the electric vehicle 1 of a motor-scooter type according to the present embodiment, the center tunnel region 35 is disposed along the front and rear direction of the electric vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the electric vehicle 1. The left and right upper frames 25 are bent at a spot where the lower ends of the center protection frame 30b are joined thereto, and extend to the rear of the electric vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37. Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates a electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the electric vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13*a* and rear half part 13*b* to the rear half part 13*b*. That is, in the side view of the vehicle, the fuel cell 2 is disposed between the rear half part 13*b* of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2*a* is disposed, faces forward and obliquely downward, and its back face, in which the exhaust port 2*b* is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2*a* of air, and configured to control the amount of air introduced to the fuel cell stack by opening/closing the intake port 2*a*. The intake shutter configured to constitute a circulation path for circulating air in the fuel cell 2 by closing the intake port 2*a*. The exhaust shutter includes an openable/closable exhaust port 2*b* of air and configured to constitute the circulation path for circulating air in the fuel cell 2 by closing the exhaust port 2*b*. In other words, the fuel cell 2 includes the openable/closable intake port 2*a* in the front face, and the openable/closable exhaust port 2*b* in the back face, and configured to cause air to be circulated in the fuel cell 2 by closing the intake port 2*a* and the exhaust port 2*b*.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52*a* opened toward rearwardly downward, and rearwardly upward at the rear end of the vehicle body 5. The exhaust duct 52 guides exhaust gas (excess gas) ejected from the fan of the fuel cell 2 to the exhaust port 52*a* and discharges it to the rear of the vehicle body 5.

The exhaust port 52*a* is disposed higher than the exhaust face (back face), and preferably at the upper end part of the rear section of the exhaust duct 52. In other words, the upper edge part of the exhaust port 52*a* is disposed at a position higher than the exhaust port of the fuel cell 2. As a result of having the exhaust port 52*a* disposed to be higher than the exhaust face (back face) of the fuel cell 2, the exhaust duct 52 guides a wet excess gas containing unreacted hydrogen gas to the exhaust port 52*a* and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the electric vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30f being constructed between the upper parts of the front protection frame 30a and the center protection frame 30b of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported to the seat 13 via a hinge mechanism (not shown), and opens/closes by being swung. The fuel filling joint 57 has a fuel filling port 56 as an inlet for introducing high pressure gas of hydrogen as a fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the electric vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the electric vehicle 1 includes, besides the rechargeable battery 16, a second rechargeable battery 64 supplying, for example, 12V-based power as a power supply for meters (not shown) and lights (not shown). The second rechargeable battery 64 is disposed around the head pipe 21, for example, beside the right side of the head pipe 21.

In the electric vehicle 1, even if hydrogen gas as fuel leaks from the fuel filling port 56, the hydrogen gas, which is lighter than air, moves up, thus diffusing to the outside of the electric vehicle 1 without residing within the electric vehicle 1. Even if hydrogen gas as fuel leaks from the fuel filling main valve 58 or the fuel supply main valve 59, the hydrogen gas moves toward the tire house region 37, thus diffusing to the outside of the electric vehicle 1 without residing within the electric vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the electric vehicle 1, for example, beside the left side of the head pipe 21 corresponding to the opposite side of the second rechargeable battery 64, which supplies 12V-based power.

Next, a converter arrangement for the electric vehicle 1 will be described in detail.

Figure 4:
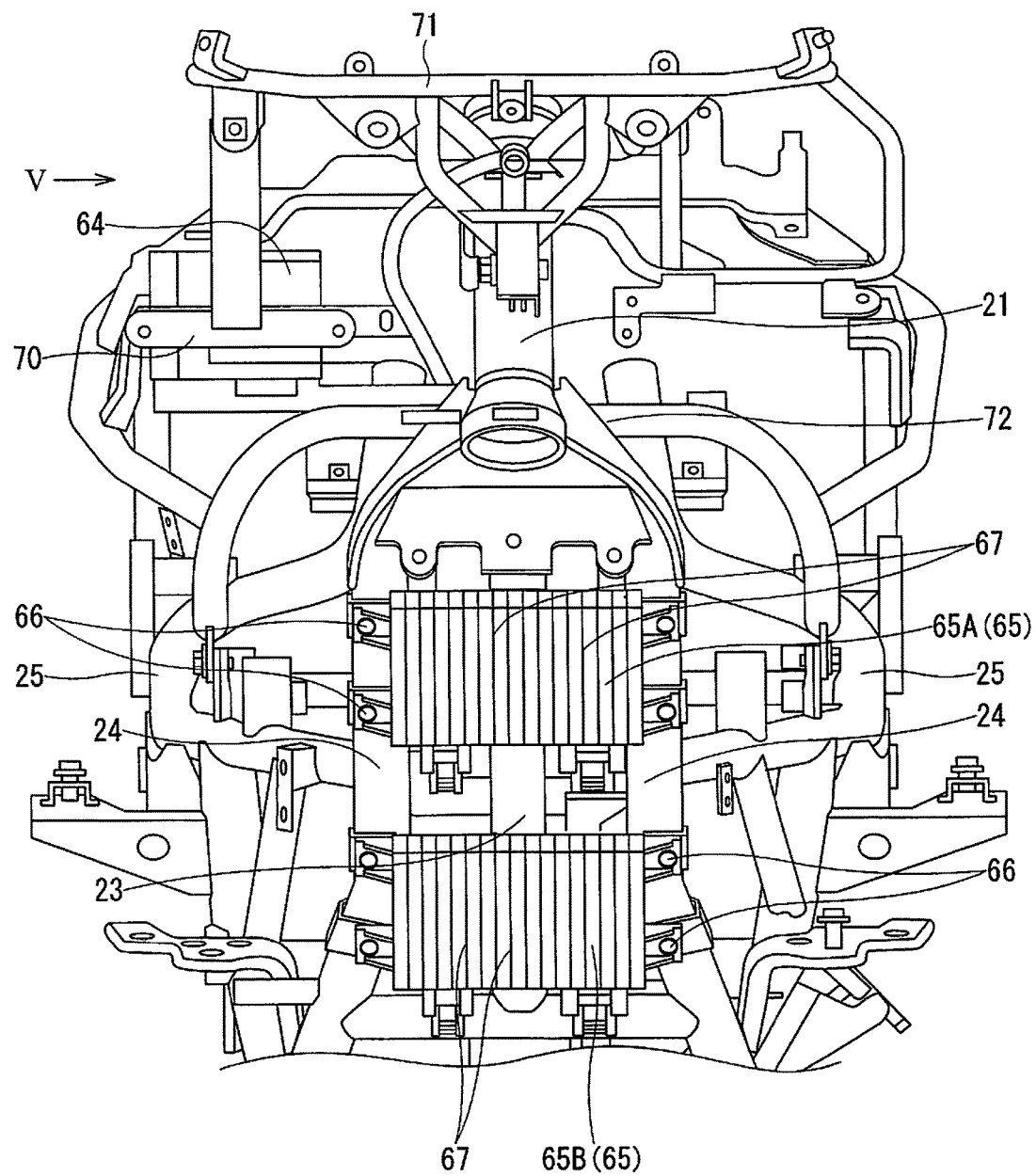
FIG. 4 is a front view of a frame structure of the electric vehicle according to the present invention.
Figure 5:
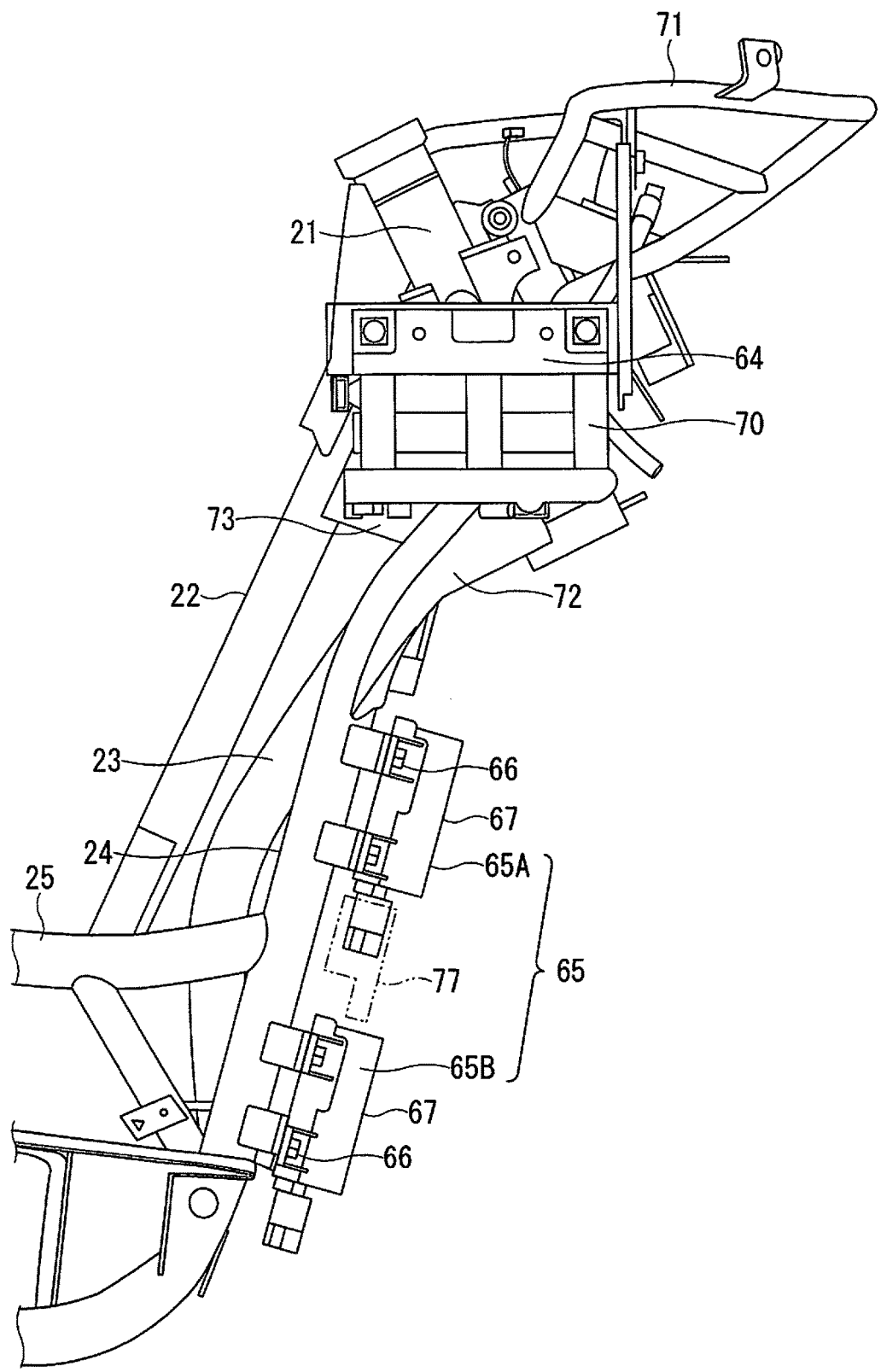
FIG. 5 is an illustration of FIG. 4 as viewed from a direction of an arrow V.

As illustrated in FIGS. 2, 4, and 5, the electric vehicle 1 according to the embodiment allows a DC/DC converter 65 to convert voltage of electric power with relatively high voltage generated in the fuel cell 2 or stored in the rechargeable battery 16 to a voltage of 12 volt, and to be stored in the second rechargeable battery 64. At least one DC/DC converter 65 is used, and the embodiment employs a plurality of DC/DC converters 65, such as two DC/DC converters 65A and 65B. That is, a plurality of DC/DC converters 65 such as two converters (DC/DC converters 65A and 65B) are used.

The DC/DC converters 65A and 65B each include left and right opposite ends that are fixed and attached with, for example, bolts 66 to the corresponding inclined portions on a front side of the left and right bottom frames 24 extending from the head pipe 21 backward and downward as a frame member. The DC/DC converters 65A and 65B are disposed behind the front wheel 6 in a posture facing the travelling direction while allowing a coupler, to which a power supply wire (not illustrated) is connected, to be disposed downward. The DC/DC converters 65A and 65B are disposed away from each other in the vehicle vertical direction.

At least one of the fuel cell 2 and the rechargeable battery 16 is sequentially connected to the DC/DC converter 65B, the DC/DC converter 65A, and the second rechargeable battery 64, in series using the power supply wire (not illustrated). The DC/DC converters 65B and 65A convert voltage stepwise. The DC/DC converters 65A and 65B may employ identical converters or different ones that are connected in parallel. The DC/DC converters 65A and 65B each include a plurality of heat radiation fins 67 that are provided in a front face on a front wheel 6 side along the vertical direction. That is, the heat radiation fins 67 are provided in the front face of each of the DC/DC converters 65A and 65B, facing the front wheel 6, and extend along the vehicle vertical direction. While the DC/DC converter 65 generates heat during voltage conversion to reach a high temperature to cause deterioration of conversion efficiency, air flowing between the plurality of heat radiation fins 67 cools the DC/DC converters 65A and 65B. This reduces deterioration in the conversion efficiency of the DC/DC converters 65A and 65B.

Figure 6:
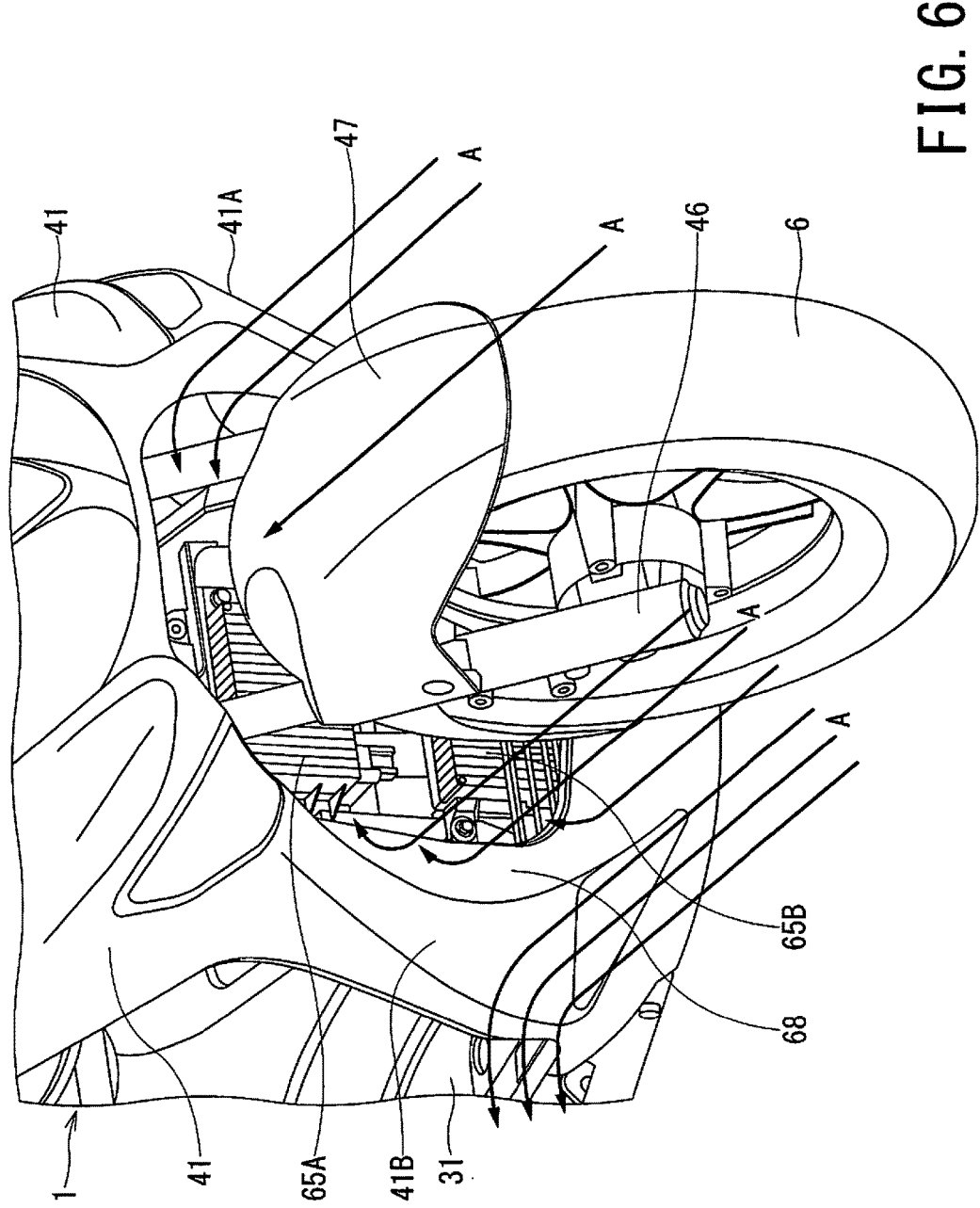
FIG. 6 is a partial perspective view of the electric vehicle according to the present invention viewed obliquely from front.
Figure 7:
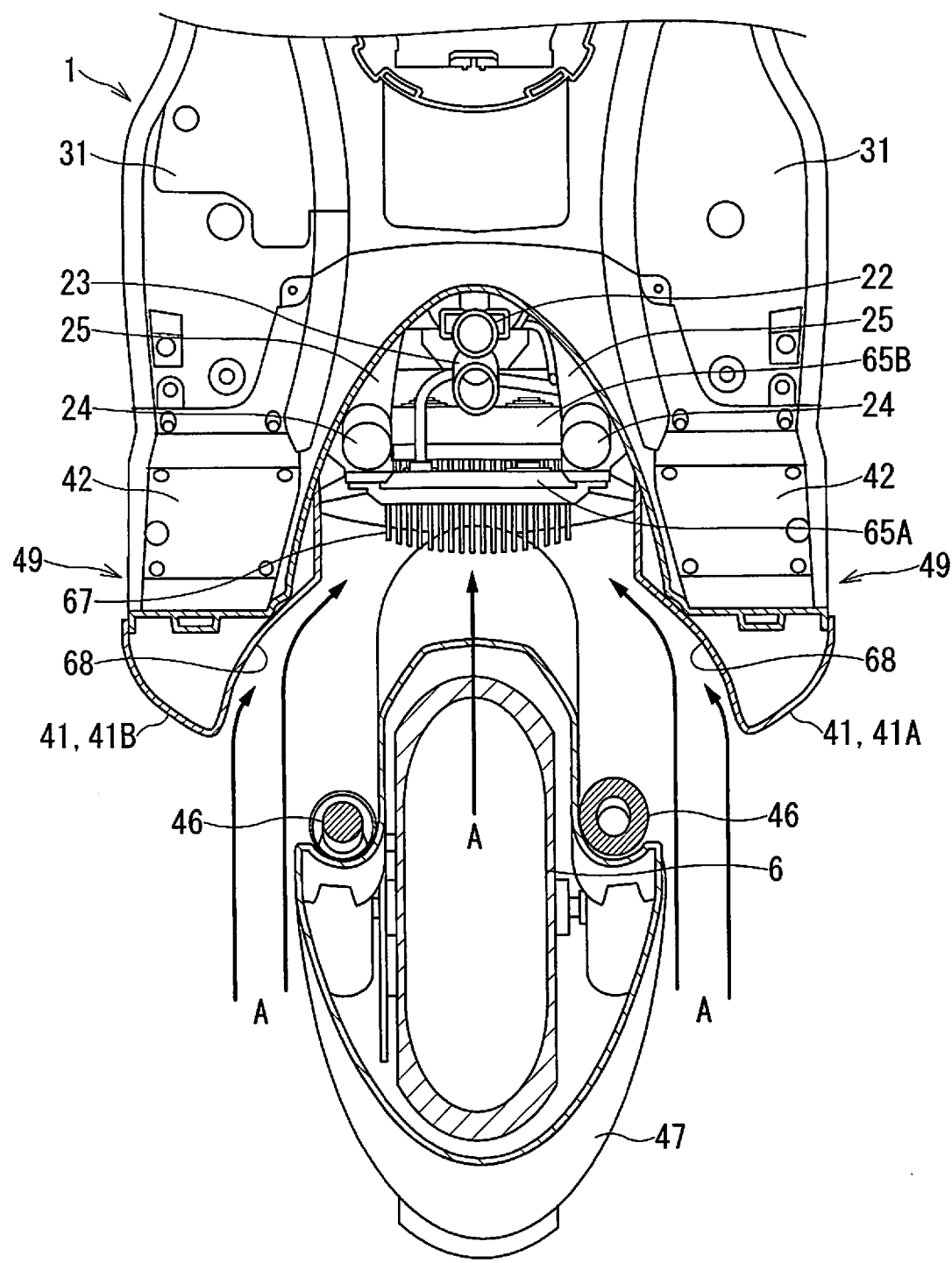
FIG. 7 is a sectional view taken along line VII-VII of FIG. 1.

As illustrated in FIGS. 1, 6, and 7, the front leg shield cover 41 as a front cowl of the electric vehicle 1 according to the embodiment is disposed in the front of the vehicle body 5 to cover the periphery of the head pipe 21 from the front. The front leg shield cover 41 includes a pair of lower-halves 41A and 41B (refer to FIGS. 1 and 7) that branch in left and right directions. The pair of lower-halves 41A and 41B extends to a lower-half position of the front wheel 6 to be joined to the front frame cover 42 to constitute a leg shield 49. That is, the front leg shield cover 41 with which the periphery of the head pipe 21 is covered hangs and extends to the lower-half of the front wheel 6.

The left lower-half 41A and the right lower-half 41B of the front leg shield cover 41 are positioned on both respective sides of the DC/DC converters 65A and 65B in the vehicle width direction. Each of the left lower-half 41A and the right lower-half 41B includes a guide face 68 formed inside in the vehicle width direction. The guide face 68 is an inclined face that inclines rearward toward inward in the vehicle width direction.

The DC/DC converters 65A and 65B are positioned closer to the rear side of the vehicle than an inner end of the guide face 68 in the vehicle width direction. Thus, during the electric vehicle 1 running, a travelling wind A flowing on both sides of the front wheel 6 is guided to the guide face 68 to be collected to the DC/DC converters 65A and 65B, In addition, the travelling wind A flowing above the front fender 47, as illustrated in FIG. 2, flows along a curved face shape of the front fender 47 to be collected in front of the DC/DC converters 65A and 65B. That is, the front leg shield cover 41 expands to left and right sides of the DC/DC converters 65A and 653 to collect travelling wind to the DC/DC converters 65A and 65B. The travelling wind A collected flows vertically along the heat radiation fins 67 to effectively cool the DC/DC converters 65A and 65B.

As illustrated in FIGS. 4 and 5, the second rechargeable battery 64 connected to the DC/DC converter 65A through the power supply wire (not illustrated) is disposed above the DC/DC converter 65A and on a side (e.g. a right side) of the head pipe 21 by using a battery holder 70. A front cowl brace 71 for attaching the front leg shield cover 41 is provided to the periphery of the head pipe 21. A joint portion between the bottom frame 24 and the head pipe 21 is reinforced by a reinforcement plate 72. The bottom frame 24 and an upper end of an upper down tube 22 are joined to each other by using a joint bar 73.

Figure 8:
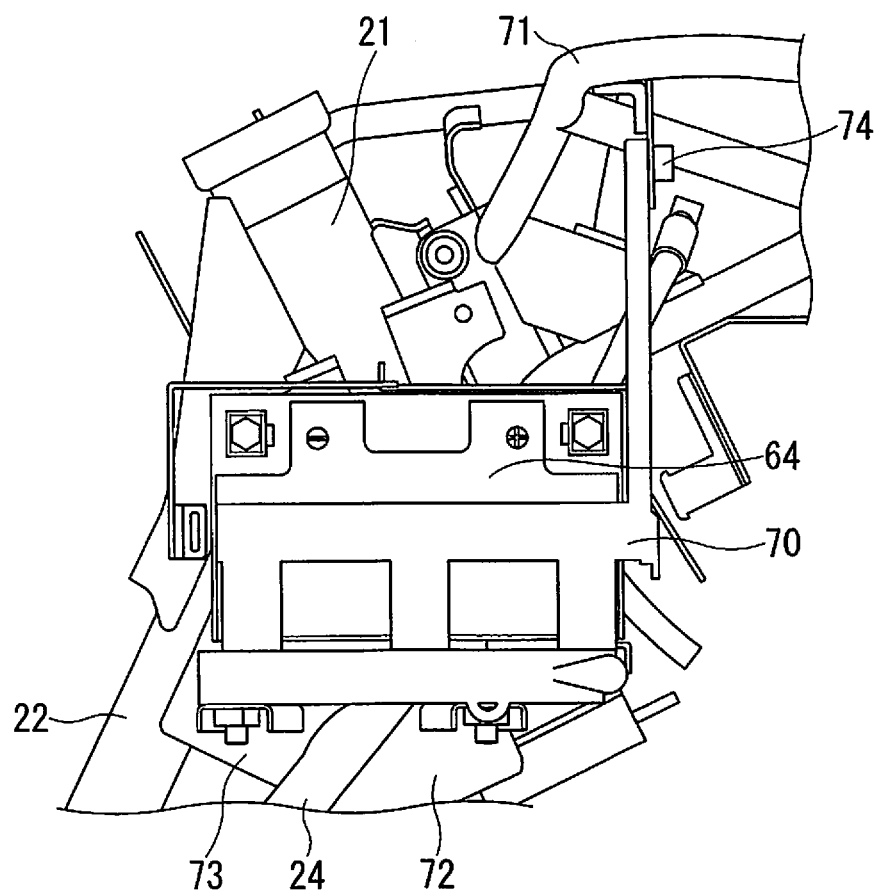
FIG. 8 is an enlarged view of the periphery of a battery body of the electric vehicle according to the present invention.
Figure 9:
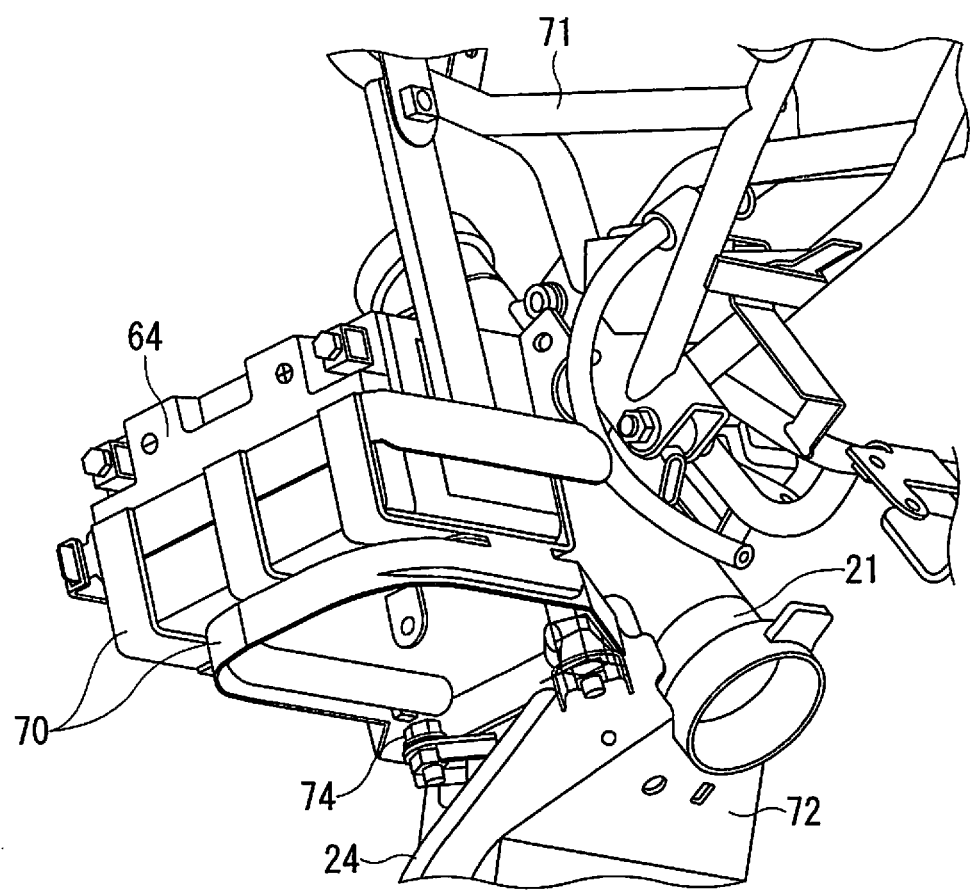
FIG. 9 is a perspective view of the periphery of a battery holder of the electric vehicle according to the present invention viewed obliquely from below.
Figure 10:
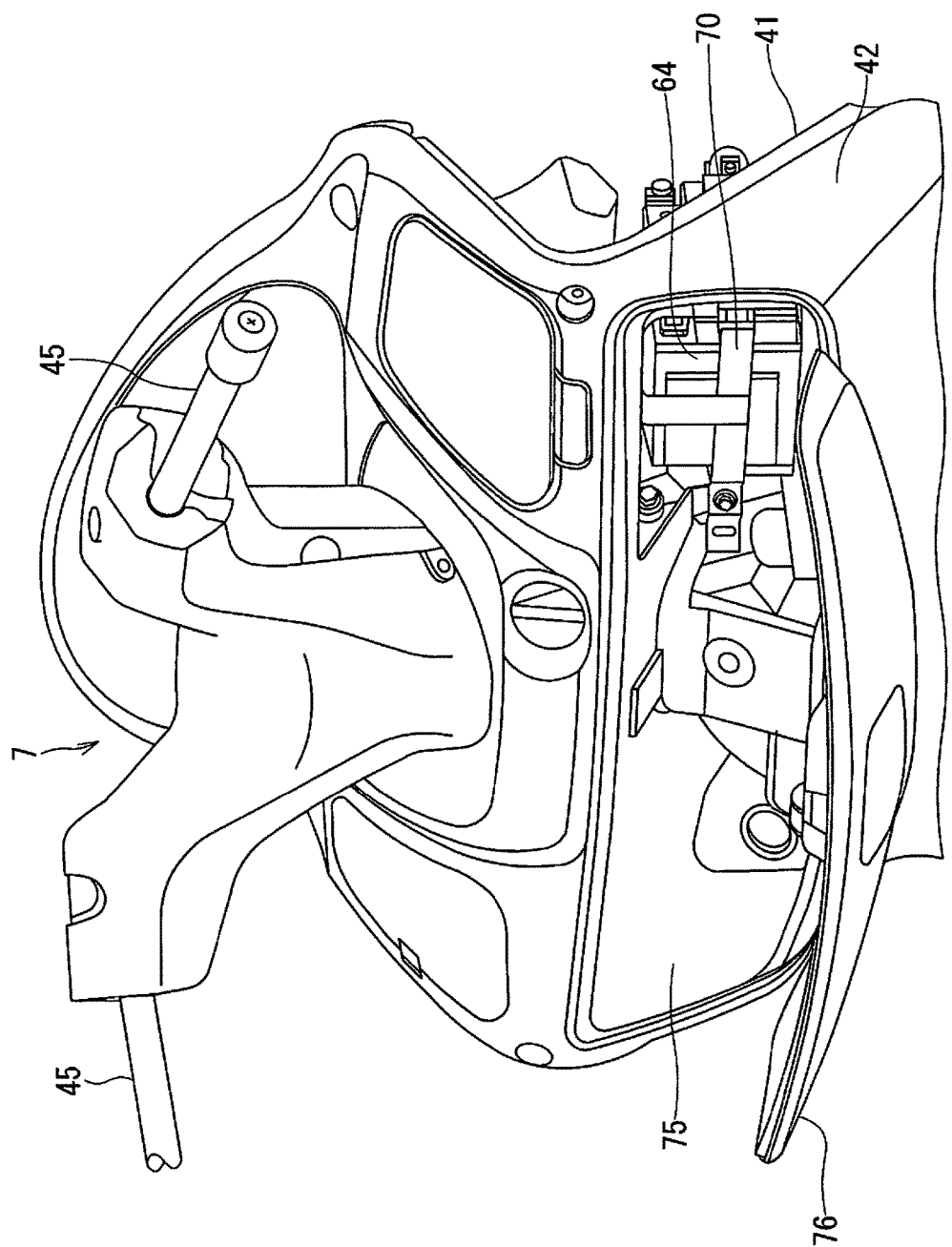
FIG. 10 is a perspective view illustrating the inside of a glove box provided in a front frame cowl of the electric vehicle according to the present invention.

As illustrated in FIGS. 8 and 9, the battery holder 70 of the electric vehicle 1 according to the embodiment has a frame shape of a substantially rectangular parallelepiped to be able to accommodate the second rechargeable battery 64. The bottom of the battery holder 70 is fixed and attached to the reinforcement plate 72 and reinforcement bar 73 with bolts 74. The upper portion of the battery holder 70 is fixed and attached to the front cowl brace 71 with the bolts 74. The second rechargeable battery 64 accommodated in the battery holder 70, as illustrated in FIG. 10, is disposed deep inside of a glove box 75 formed in the front frame cover 42 disposed behind the front leg shield cover 41.

The present embodiment is configured as above, and thus achieves the following effects (1) to (4).

(1) As illustrated in FIGS. 4 to 7, the electric vehicle 1 according to the embodiment includes the DC/DC converters 65 (DC/DC converters 65A and 65B) that are provided in inclined portions on a front side of the bottom frames 24 extending from the head pipe 21 backward and downward in a vehicle, and allows guide faces 68 of the left lower-half 41A and the right lower-half 41B of the front leg shield cover 41 to collect the travelling wind A to the DC/DC converters 65A and 65B. In addition, the electric vehicle 1 also collects the travelling wind A flowing along a curved face of an upper face of the front fender 47 to the DC/DC converters 65A and 65B. Thus, the electric vehicle 1 enables cooling performance for the DC/DC converters 65A and 65B to be improved by using the travelling wind A.

Further, the electric vehicle 1 according to the embodiment includes the heat radiation fins 67 of the DC/DC converters 65A and 65B, being provided along the vehicle vertical direction, and thus when the vehicle is stopped, air rises along the heat radiation fins 67 to enable the cooling performance for the DC/DC converters 65A and 65B to be improved.

(2) The electric vehicle 1 according to the embodiment includes a plurality of DC/DC converters (e.g. the DC/DC converters 65A and 65B), and thus enables the DC/DC converter 65 to be disposed without increasing its size in the vehicle width direction as compared with a case of using a single DC/DC converter.

In addition, the electric vehicle 1 according to the embodiment includes the plurality of DC/DC converters (e.g. the DC/DC converters 65A and 65B) that is disposed away from each other in the vehicle vertical direction, and thus enables the travelling wind A to flow to the rear of the vehicle through a gap between the DC/DC converters 65A and 65B. As a result, the electric vehicle 1 enables, for example, the fuel cell 2 disposed in the rear of the vehicle to be effectively cooled. Further, the electric vehicle 1 allows a lower end of the DC/DC converter 65A on an upper side and an upper end of the DC/DC converter 65B on a lower side to be disposed away from each other in the vehicle vertical direction, and thus the coupler projecting downward from the DC/DC converter 65A on the upper side can be disposed between the DC/DC converter 65A and the DC/DC converter 65B to wire the power supply wire, thereby enabling a waterproof structure of the coupler against rainwater to be easily achieved.

Furthermore, the electric vehicle 1 according to the embodiment allows the travelling wind A to flow between the heat radiation fins 67 without staying in the DC/DC converters 65A and 65B, and the DC/DC converters 65A and 65B disposed away from each other are attached to the inclined portions on the front side of the bottom frames 24 in a posture facing the travelling direction, and thus enables the cooling performance for the DC/DC converters 65A and 65B to be improved.

(3) The electric vehicle 1 according to the embodiment includes the DC/DC converters 65 (DC/DC converters 65A and 65B) that are provided in inclined portions on a front side of the bottom frames 24 extending from the head pipe 21 backward and downward in a vehicle, and the second rechargeable battery 64 that is disposed above the DC/DC converter 65A and on a side of the head pipe 21. Thus, the electric vehicle 1 allows the DC/DC converter 65A and the second rechargeable battery 64 to be disposed relatively close to each other, thereby enabling reduction in wire length of the power supply wire connecting the DC/DC converter 65A and the second rechargeable battery 64 to each other.

In the electric vehicle 1, electric power is supplied to the second rechargeable battery 64 after being converted into a voltage e.g. 12 volts by the DC/DC converters 65 (DC/DC converters 65A and 65B) while causing a substantial current increase, it requires a relatively thick and rigid power supply wire between the DC/DC converter 65 and the second rechargeable battery 64. Thus, reducing the power supply wire in length will facilitate wiring operation thereof, and enables weight-saving of the electric vehicle 1 to be achieved.

(4) The electric vehicle 1 according to the embodiment includes the second rechargeable battery 64 that is disposed in the glove box 75 in the front frame cover 42, and thus the second rechargeable battery 64 can be attached and detached by opening a glove box lid 76 for opening and closing the glove box 75, thereby enabling maintenance of the second rechargeable battery 64 to be improved.

Although the embodiment of the present invention is described as above, the embodiment is presented as an example. Thus, there is no intention to limit the scope of the invention. The embodiment can be practiced in other various aspects, and thus various omissions, replacements, and modifications may be made within a range without departing from the essence of the invention.

For example, a cover 77 (illustrated with a two-dot chain line in FIG. 5) may be disposed between the DC/DC converters 65A and 65B disposed away from each other in the vehicle vertical direction to hide, for example, the power supply wire. While the embodiment describes a case where the electric vehicle 1 is a fuel-cell-driven two-wheeled vehicle, the present invention may be applied to an automatic two-wheeled vehicle, an automatic three-wheeled vehicle, or a buggy vehicle, being provided with a fuel cell or a normal rechargeable battery.

Thus, the present invention allows the DC/DC converter to be provided in the frame member extending from the head pipe backward and downward in a vehicle, and allows the front cowl to collect travelling wind to the DC/DC converter, thereby enabling cooling performance of the DC/DC converter to be improved. In addition, the heat radiation fins of the DC/DC converter are provided along the vehicle vertical direction, and thus when the vehicle is stopped, air rises along the heat radiation fins to enable the cooling performance for the DC/DC converter to be improved.

What is claimed is:

1. An electric vehicle comprising:
   a front wheel;
   a rear wheel;
   a steering mechanism supporting the front wheel;
   a head pipe supporting the steering mechanism;
   a frame member extending from the head pipe backward and downward;
   a front cowl covering the head pipe, the front cowl hanging and extending to a lower-half of the front wheel;
   an electric motor configured to rotate and drive the rear wheel;
   at least one DC/DC converter disposed in the frame member behind the front wheel in a posture facing a travelling direction to convert voltage;
   a heat radiation fin extending in a vehicle vertical direction, the heat radiation fin being provided in a front face of the DC/DC converter, the front face facing the front wheel; and
   a battery disposed above the DC/DC converter and on a side of the head pipe to be connected to the DC/DC converter,
   wherein the front cowl expands to left and right sides of the DC/DC converter in the vehicle width direction to collect travelling wind to the heat radiation fin.

2. The electric vehicle according to claim 1, wherein the at least one converter comprises a plurality of converters, and the converters are disposed away from each other in the vehicle vertical direction.

3. The electric vehicle according to claim 1, wherein the electric vehicle is a motor scooter, and the battery is disposed in a glove box disposed behind the front cowl.

4. The electric vehicle according to claim 2, wherein the electric vehicle is a motor scooter, and the battery is disposed in a glove box disposed behind the front cowl.

5. The electric vehicle according to claim 1, further comprising a fuel cell connected to the DC/DC converter.

6. The electric vehicle according to claim 2, further comprising a fuel cell connected to the DC/DC converter.

7. The electric vehicle according to claim 3, further comprising a fuel cell connected to the DC/DC converter.

8. The electric vehicle according to claim 4, further comprising a fuel cell connected to the DC/DC converter.

* * * * *